A. LELAND.
Cultivator.
No. 5,998. Patented Jan. 2, 1849.
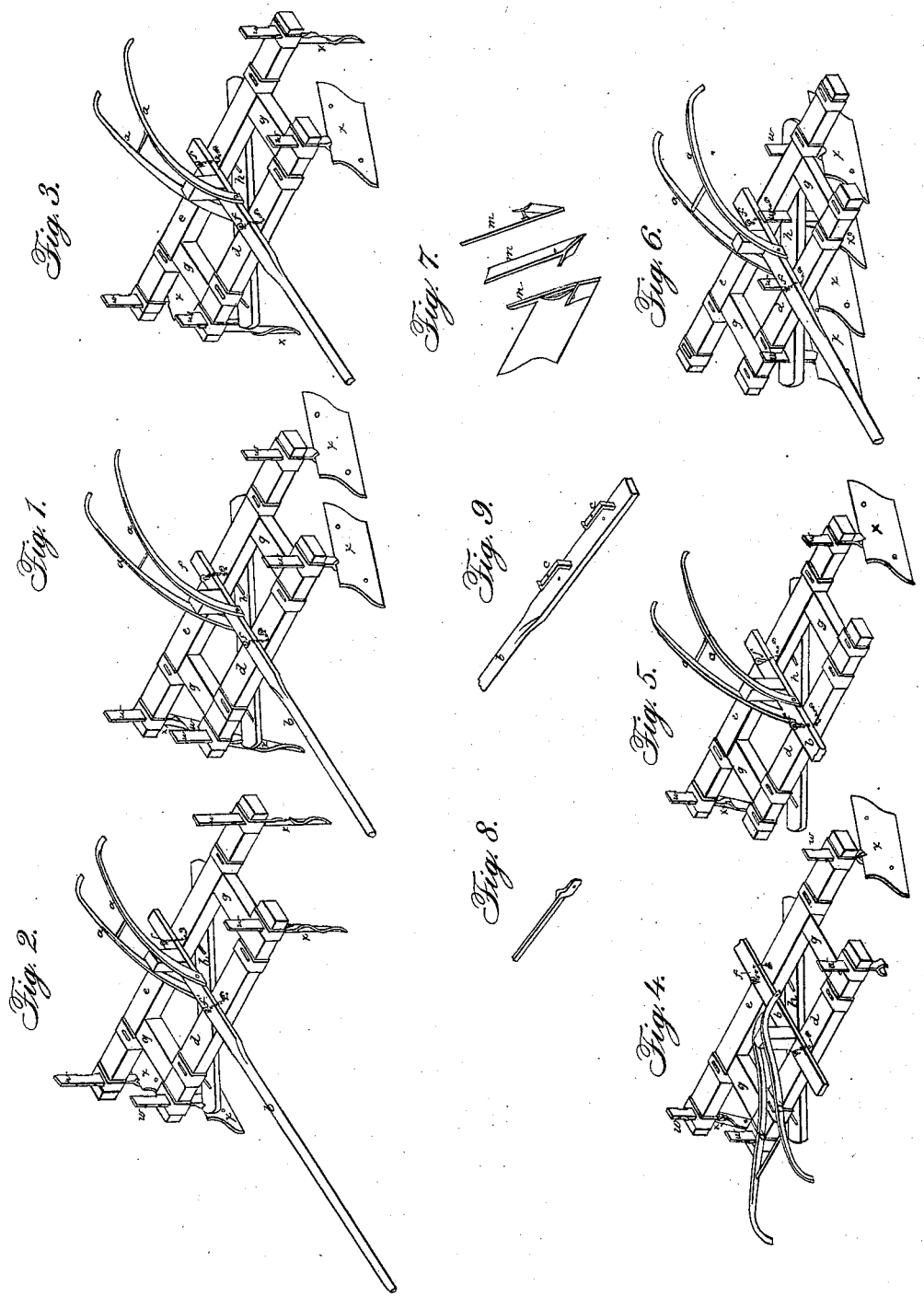

UNITED STATES PATENT OFFICE.

ABNER LELAND, OF MILTON, PENNSYLVANIA.

IMPROVEMENT IN COMBINED PLOWS.

Specification forming part of Letters Patent No. 5,998, dated January 2, 1849.

*To all whom it may concern:*

Be it known that I, ABNER LELAND, of Milton, in the county of Northumberland and State of Pennsylvania, have invented certain new and useful Improvements in Corn and Seed Plows, of which the following is a full and exact description, reference being had to the annexed drawings of the same, making part of this specification, in which the several figures are isometrical perspective views of the plow—

Figure 1 representing the shares arranged for turning the soil from the center toward the sides of the frame. Fig. 2 represents the shares arranged so as to turn the soil from the sides toward the center. Fig. 3 represents the shares arranged so that those in front will turn the soil from the center outward, while the after shares will turn it back again, thus rendering the central ridge of soil thoroughly pulverulent, and effectually uprooting any weeds that may have been growing in it. Fig. 4 represents the plow arranged in a suitable manner for "scoring out," or making furrows in which to plant corn. Fig. 5 is a view of the machine with the position of the shares unchanged, but with the tongue reversed, so that by drawing it in this position over the furrows made by the plow in the position last represented the seed planted therein will be lightly covered and the soil pressed down upon it. Fig. 6 represents the shares arranged in the diagonal beam for the purpose of plowing in grain sown broadcast over the land. By reversing the tongue seed planted in furrows made by the last arrangement will be lightly covered and the soil pressed upon it. Fig. 7 is a modified arrangement of the share, having a removable landside attached to it, which it has been found advisable to use in some cases. Fig. 8 is a view of one of the standards detached, and Fig. 9 is a view of the tongue detached and reversed to show the form of the brackets by which it is attached to the frame.

The same letters indicate the same parts in all the figures.

The nature of my invention and improvement consists in shaping the shares so that they will serve the treble purpose of making furrows in which to plant seed, covering the seed, and pressing down the soil with which it is covered; also, in arranging the tongue by which the horses draw so that it can be made to project from the narrow or the wide end of the plow at the option of the operator, by which means the narrow end of the plow can be carried forward and the soil turned from the center outward, so as to form a deep wide furrow or ditch; or the wide end can be placed in front and the soil turned from the sides to the center, so as to make a broad ridge; likewise, in attaching to the share a removable landside.

The handles *a* and the tongue *b* are firmly connected together by screw-bolts or otherwise, the former being inclined to one side of the frame, that they may with greater convenience be held by the attendant, who must necessarily walk on one side of the corn when the soil between the rows is being plowed. On the under side of the tongue are two metallic brackets, *c*, which hook over the cross-beams *d e*, fitting into notches made to receive them, and held in place by removable pins or bolts *f*, by withdrawing which the tongue can be slipped back and detached, reversed, and again secured with great ease and facility.

The frame is composed of two transverse beams, *d* and *e*, connected by two longitudinal pieces, *g*, and of a diagonal beam, *h*, secured to the under side of the frame by bolts or otherwise. These beams are perforated by mortises to receive the shanks *w* of the shares *x*, to strengthen the mortises and hold the shanks more securely therein. Each of them is surrounded by a band made of strap-iron, which is perforated by mortises corresponding with the mortises of the beam. The shanks are held in the mortises by means of notches formed in one edge and a wedge or clamp-screw pressing against the other. The shanks can be raised or lowered and secured at any elevation at which they may be placed by the wedges and notches. The lower end of the shanks are shaped to correspond with that part of the shares to which they are attached, the shares being secured to the shanks by screw-bolts.

The shares are of a rhombic form, with two of their edges bent in opposite directions, as represented, the curve of the edges being such as will best adapt it, when drawn forward, as in Figs. 1 and 2, &c., to penetrate and cut the soil, and when drawn backward, as in Fig. 5, to smooth and press it down. When the edges of the shares become worn they can be severed by simply removing the screws which secure them to the shank, and thus be made to operate as well as when they are new. The shares are provided with a removable landside, m, as represented in Fig. 7, to correct the tendency which they have to move in a direction parallel to the plane of their sides. This difficulty can only occur when all the shares are placed so as to turn the soil in one direction, as in Fig. 6, and of course it is only when so arranged that the landside is attached.

Fig. 7 shows a perspective and a bottom view of the landside detached from the share or tooth, and shows also the screw-bolt by which it is fastened to the share.

The landside and share may also be connected by means of removable staples and keys, or any of the devices commonly employed to connect the point of a plow to the mold-board. The share and landside are both made of cast or wrought iron or other metal; but I prefer to make the share of wrought-iron edged with steel, and to cast the landside.

What I claim as my invention, and desire to secure by Letters Patent, is—

The construction of the removable landsides with wings, substantially as represented, in combination with shares made without either bosses, loops, or other projections upon the sides that would interfere with their being turned bottom side up and attached to the shanks in that position or obstruct their action when thus turned, the landsides and shares so constructed being connected together by one or more screw-bolts, or by other analogous means.

In testimony whereof I have hereunto signed my name before two witnesses.

ABNER LELAND.

Witnesses:
JACOB WHEELAND,
F. STICKER.